United States Patent
Sanschagrin et al.

(10) Patent No.: US 6,295,540 B1
(45) Date of Patent: Sep. 25, 2001

(54) ALIGNMENT OF TIRKS USING NETWORK MANAGER

(75) Inventors: Michel Sanschagrin, Mont-Royal (CA); Chandra Mouli Ramani, Atlanta, GA (US); John Patrick Omura; Karen Patricia McEachern, both of Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/165,120

(22) Filed: Oct. 2, 1998

Related U.S. Application Data

(60) Provisional application No. 60/061,054, filed on Oct. 2, 1997.

(51) Int. Cl.[7] ............................................. G06F 17/30
(52) U.S. Cl. ..................... 707/201; 707/10; 707/102; 705/22; 379/9; 709/203; 714/2
(58) Field of Search .................. 707/10, 104, 201, 707/202, 203, 102; 705/22; 379/9, 10, 12, 22, 26, 29, 247; 709/220, 223, 226; 714/2, 15, 20, 21, 25, 48

(56) References Cited

U.S. PATENT DOCUMENTS

| | | | |
|---|---|---|---|
| 5,420,917 | * | 5/1995 | Guzman ............................. 379/279 |
| 5,627,836 | * | 5/1997 | Conoscenti et al. ................ 370/397 |
| 5,687,212 | * | 11/1997 | Kinser, Jr. et al. .................... 379/10 |
| 5,687,224 | * | 11/1997 | Alley, Jr. et al. ..................... 379/201 |
| 5,774,689 | * | 6/1998 | Curtis et al. .......................... 395/500 |
| 5,920,846 | * | 7/1999 | Storch et al. ............................ 705/7 |
| 5,953,389 | * | 9/1999 | Pruett et al. ............................. 379/9 |
| 6,094,660 | * | 7/2000 | Glitho ................................. 707/104 |

* cited by examiner

Primary Examiner—Hosain T. Alam
(74) Attorney, Agent, or Firm—Foley & Lardner

(57) ABSTRACT

A network management system supports network operators in their day-by-day provisioning, using a data synchronizer. First, the synchronizer initiates an inventory verification request specifying the verification data to be returned. The synchronizer then determines the network manager (NM) and the record keeping system involved in the inventory verification request and sends a request to the NM and the record keeping system for the inventory information of interest. The synchronizer receives current inventory data from the NM and inventory data from the record keeping system, and compares the current inventory data and the inventory data from the record keeping system to determine data discrepancies. A discrepancy may be corrected automatically or be the operator. An application of the synchronizer is for updating inventory data of a trunk integrated record keeping system (TIRKS) using an integrated network manager (INM).

12 Claims, 5 Drawing Sheets

ALIGNMENT OF TIRKS USING NETWORK MANAGER

This application claims benefit of Provisional No. 60/061,054 filed Oct. 2, 1997.

BACKGROUND OF THE INVENTION

1. Field of the Invention

This invention is directed to a network management system which supports network operators in their day-by-day provisioning, and in particular is directed to an automated TIRKS™ network management system data alignment.

2. Background Art

Many of today's intelligent network elements have the ability to report their configuration to an external management system either on request or autonomously as changes occur.

TIRKS™ (Trunk Integrated Record Keeping System) is a Bellcore integrated, computerized network management system that supports the provisioning process for special service circuits, message trunks, and carrier circuits, and also provides inventory management of facilities and equipment.

The TIRKS system supports the full range of transmission technologies, such as SONET, including self-healing rings and other sophisticated SONET configurations, European digital hierarchy standards (SDH), digital circuitry hierarchy (DS0, DS1, DS3), and analog voice circuits.

The TIRKS system allows users to automatically log, route, and monitor the progress of work orders (WO), perform end-to-end circuit design based on generic specifications and automated scripts, view and maintain an accurate, up-to-date inventory of all facilities and equipment and their assignments, execute interactive, user-defined queries and generate customized reports of work center activity, critical dates, and jeopardy conditions, and interface seamlessly with other Bellcore operations support systems. However, discrepancies may occur from data entry errors, equipment not installed as planned, discrepancies between the actual plug-ins shipped from those expected, substitutions or errors by field personnel, or EMS being unable to make an assignment.

NORTEL'S integrated network management/manager (INM) broadband product is an open, multi-technology and multi-vendor distributed element management system. Based on the common object request broker architecture (CORBA) technology, INM is comprised of three layers, namely a graphical user interface (GUI), building blocs (BBs), and managed object agents (MOA). Nortel's Integrated Network Management (INM) Broadband element management system (EMS) employs the philosophy of "the network is the database", and can make use of current technology to obtain an accurate, up-to-date view of the configurations of all the network elements that the INM controls.

The GUI comprises two graphical user interfaces, a graphical network browser (GNB) and a graphical network editor (GNE), which deliver functions such as surveillance, connection provisioning, software delivery, remove inventory and performance monitoring.

The BBs are software units providing sopecific functionality to the GUI, but through open, standards-based CORBA interfaces. Current INM broadband BBs include fault management, resource management, connection management, nodal connection management and performance management building blocks. Other BBs may be added as they emerge.

MOAs consolidate and adapt information from the network under their management control to open, standards-based CORBA interfaces. CORBA-based MOAs communicate with the managed network using TL1 (transaction language-1), SNMP (simple network management protocol), CMIP (common information management protocol) or proprietary protocols.

One of the objectives of modern telecommunications management network (TMN) architectures is to confine details of the network to the element management layer. Thus, network element management systems (EMSs) perform technology specific Operations, Administration, Maintenance and Provisioning (OAM&P) functions, while the network and service management layers operate using abstractions of the underlying network technology.

The TIRKS system databases do not always accurately reflect how the equipment is actually configured in the network. Inaccurate data can cause fallout in the provisioning process, stranding of equipment, and unnecessary dispatches resulting in increased costs, missed due dates, and customer dissatisfaction. Field condition that may create database discrepancies include: assignment made by the provisioning system is actually in use and therefore not available, incorrect assignment based on incorrect view of the actual field conditions, missing equipment plug-ins in the field; and the EMS being unable to make assignment.

Current TIRKS users must contend with on-going TIRKS database discrepancies between the facilities assignments associated with service or repair orders and the actual field conditions encountered. The only other known solution to update TIRKS databases is a manual solution. Subsequent to completing the service or repair order, work center personnel uses the actual field information discovered using the INM broadband user interface (Ul) to manually update the TIRKS database.

This technique has been fairly successful, although disadvantages include sheer amount of data (hence human effort) involved and its reactive versus proactive nature. This activity can sometimes lead to multiple database corrections because of numerous inaccuracies. In addition, for the most part, this update effort is triggered by service or repair activity and is not part of a programmed work effort.

SUMMARY OF THE INVENTION

It is an object of this invention to improve the database accuracy of a TIRKS inventory system and associated downstream systems.

It is another object of the invention to provide an efficient way to improve the accuracy, and thereby reduce costs, improve follow-through, and allow better utilization of network resources, by employing self-reported configuration data to verify and align Operations Systems (OS) databases.

Still another object of the invention is to provide the ability to verify, and where possible to automatically update TIRKS inventory databases of a network using equipment inventory and configuration data obtained from a network manager. The invention addresses the TIRKS enhancement effort to verify plug-in presence and usage for the intelligent network elements (INE) of a telecommunication network. The invention makes use of current technology to obtain an accurate, up-to-date view of the configurations of all network elements that a network manager controls.

Accordingly, the invention provides a method for alignment of inventory data obtained with a record keeping system using a network management system of a communication network, comprising: requesting an inventory verification specifying a type of data to be returned; initiating a command to separately query the network manager and the record keeping system regarding the type of data on the network; receiving, in response to the command, current inventory data returned from the network manager and the inventory data returned by the record keeping system; and comparing the current inventory data with the inventory data to determine a data discrepancy.

According to another aspect of the invention, there is provided a data synchronizer for alignment of inventory data obtained with a record keeping system and a network manager of a communication network, comprising: synchronizer logic for receiving an inventory verification request regarding a type of data on the network and providing discrepancy data whenever current inventory data returned by the network manager differs from the inventory data returned by the record keeping system; a graphical user interface for transmitting the inventory verification request from a user and for providing the data discrepancy to the user; a first interface between the network manager and the data synchronizer for producing the current inventory data in response to the inventory verification request; and a second interface between the record keeping system and the data synchronizer for producing the inventory data in response to the inventory verification request.

In particular, this invention proposes to automate the detection of misalignments by providing a method which can audit TIRKS data against network data obtained from the network manager to determine discrepancies. For each discrepancy, this method determines whether it can automatically correct the TIRKS databases or if human analysis is required. Proposed correction are recommended to the user, with the ability for the user to trigger a process to correct impacted TIRKS databases and the work order record details (WORD) documents for all affected downstream systems. Audit trails and output reports are generated.

Advantageously, the invention provides network operators with at least the following opportunities:

increased revenue from improved provisioning intervals;

savings from avoided manual intervention to correct assignment errors;

savings from increased provisioning flow-through of high capacity (HICAP) orders;

avoid penalties due to missed due dates;

improve network utilization through recovery of stranded network equipment;

lower operating costs associated with database maintenance;

increased revenue from market share retention;

savings from avoided erroneous service disconnects;

savings from delayed network reinforcements; and improve the use of the TIRKS system.

In addition to the above-mentioned benefits; this solution will improve the use of TIRKS system by leveraging the advantages of a distributed architecture.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENTS

NORTEL'S INM provides an accurate, real time view of the configurations of all the network elements that it controls. Using this self-reported NE configuration data to verify and correct OS databases provides an efficient way to improve the accuracy and thereby reduce costs, improve follow-through and allow better utilization of network resources.

The continuing pressure to reduce operations costs require reliable OS support. To capitalize on the potential of this self-reporting technology offered for example by the Nortel INM product, a high-quality, flexible, scalable, and cost-effective OS solution has been designed to provide effective update and verification.

It is to be understood that the data synchronizer according to the invention is not limited to alignment of TIRKS data using INM. Other network managers may be used to update TIRKS inventory data using the same principle as that disclosed herein. As well, other record keeping systems may be aligned using INM.

Figure 1:
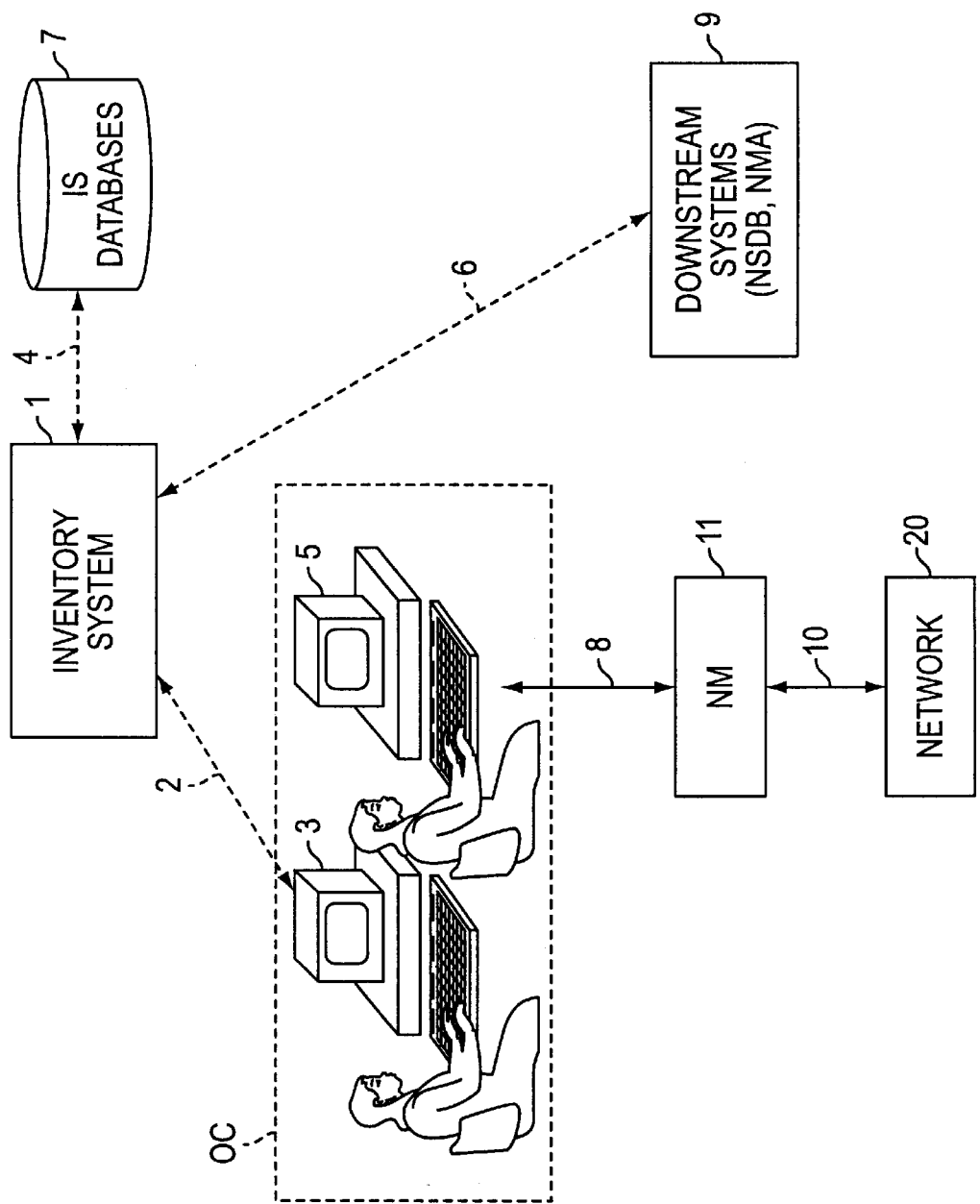
FIG. 1 shows the flow of information according to the invention in a network provided with TIRKS inventory verification and update.

FIG. 1 illustrates the current method of updating TIRKS databases. Here, the dotted line connections 2, 4 and 6 represent TIRKS interfaces, and the full line connections 8 and 10 represent the INM interfaces.

The TIRKS system shown at 1 is connected to the TIRKS databases 7 and to the downstream systems 9, for collecting information about the network managers and operation controllers currently present in the network. An operator in the operating center OC uses a TIRKS terminal 3 for inputting commands recognized by the TIRKS system, to get the inventory information on the screen.

Operating center OC is also provided with an NM terminal 5 that interactively presents to the user graphical images of various aspects of the network 20. A GUI 8 connects this terminal to an element management system (EMS) of INM 11, which in turn receives real-time connection inventory verification and updates from the intelligent network elements of network 20 over interface 10.

The inventory information or equivalent that can be retrieved from INM 11 include, for example, location/relay rack terminal identification (TID) information, hierarchy human equipment catalogue inventory group (HECIG) information, plug-in type information such as human equipment catalogue items (HECI), slot ID, and NE assignment status (in-service or not in-service).

Currently, the operators that are co-located preferably in the same operating center, detect the discrepancies between the information presented by the INM 11 on terminal 5 and that presented by TIRKS 1 on terminal 3. As the information collected by INM 11 is real time information, the operator of terminal 3 inputs manually the corrections to update the TIRKS databases 7.

Figure 2:
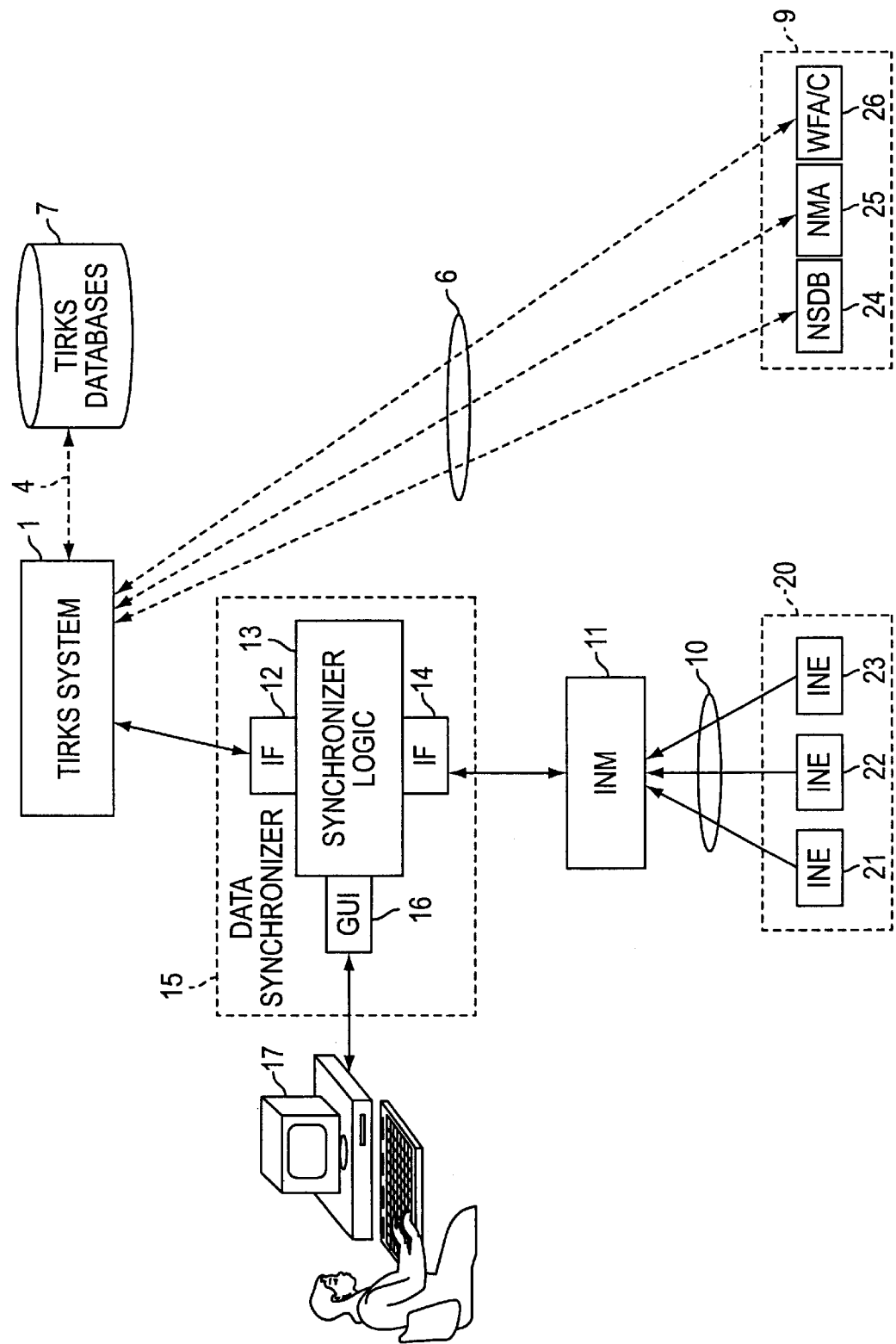
FIG. 2 shows the architecture of the automated TIRKS network management system data alignment system.

As illustrated in FIG. 2, the downstream systems 9 could comprise for example network and services databases (NSDB) 24, network monitoring and analysis (NMA) systems 25, work force administration controllers (WFA/C) 26 used by TIRKS 1, and intelligent network elements (INE) 21, 22, 23 managed by INM 11.

The method currently used involves the following activities:

Step 1. Use INM connection inventory to display, on terminal 5, the actual HICAP facility under investigation.

Step 2. Use TIRKS to display, on terminal 3, the equivalent information using the "SONET Grid" display.

Step 3. Do a "stare and compare" to detect deviations in the TIRKS inventory data.

Step 4. If a deviation is detected, decide the proper update(s) required to correct the TIRKS record(s) to reflect the actual network configuration displayed by INM.

Step. 5. Using the network element ID, and channel assignment from INM, use TIRKS to determine the corresponding relay rack number. This information is required to 'post' the update to TIRKS.

Step 6. Post an update to TIRKS using the "Circuit Description" screen on terminal 3.

The above steps are a basic description of the process that a specific TIRKS company has successfully deployed to "scrub" its TIRKS data. This TIRKS company informally estimates that it has been able to improve deficiency correction from approximately 60% misaligned data to less than 5%.

A key element of the method and system according to the invention is to provide a TIRKS/INM data synchronizer at the operating center OC, that will verify and, where practical, automatically update its databases 7 based on the equipment inventory and configuration data provided by Nortel's INM Broadband EMS.

Determination of which data discrepancy conditions can be automatically corrected and how to correct them, is learned through field trials and experience, and is company, wire center, and/or supplier equipment dependent.

This resulting architecture is depicted in FIG. 2, that shows data synchronizer 15 according to this invention. Data synchronizer 15, is designed for performing the above steps using a distributed architecture which comprises TIRKS and INM interfaces 12 and 14, a synchronizer logic module 13, and a graphical user interface (GUI) 16. The TIRKS interface 12 links the synchronizer logic 13 with TIRKS system 1, the INM interface 14 links logic 13 with INM 11, and GUI interface 16 connects logic 13 with a user terminal 17 that has now access to both TIRKS and INM systems.

Data synchronizer interface 12 supports requests for HICAP circuit data, TIRKS database corrections and work order record details (WORD) document reissue. Data synchronizer interface 14 provides the capability to automatically, or on-demand, collect connection inventory data from INM 11. For example, inventory data collection and verification can take place automatically at pre-set time intervals. GUI 16 is used for management of the verification and update process. GUI 16 also initiates, by schedule or on-demand, comparison of collected plug-in inventory information with existing TIRKS inventory data.

In addition to providing user notification of errors/inconsistencies between collected data and the TIRKS system inventory, synchronizer 15 allows a user to optionally specify automatic updating of TIRKS records when appropriate, and provides the capability to "trigger" downstream system updates. Furthermore, a data synchronizer can communicate with a plurality of INMs and TIRKSs.

Figure 3:
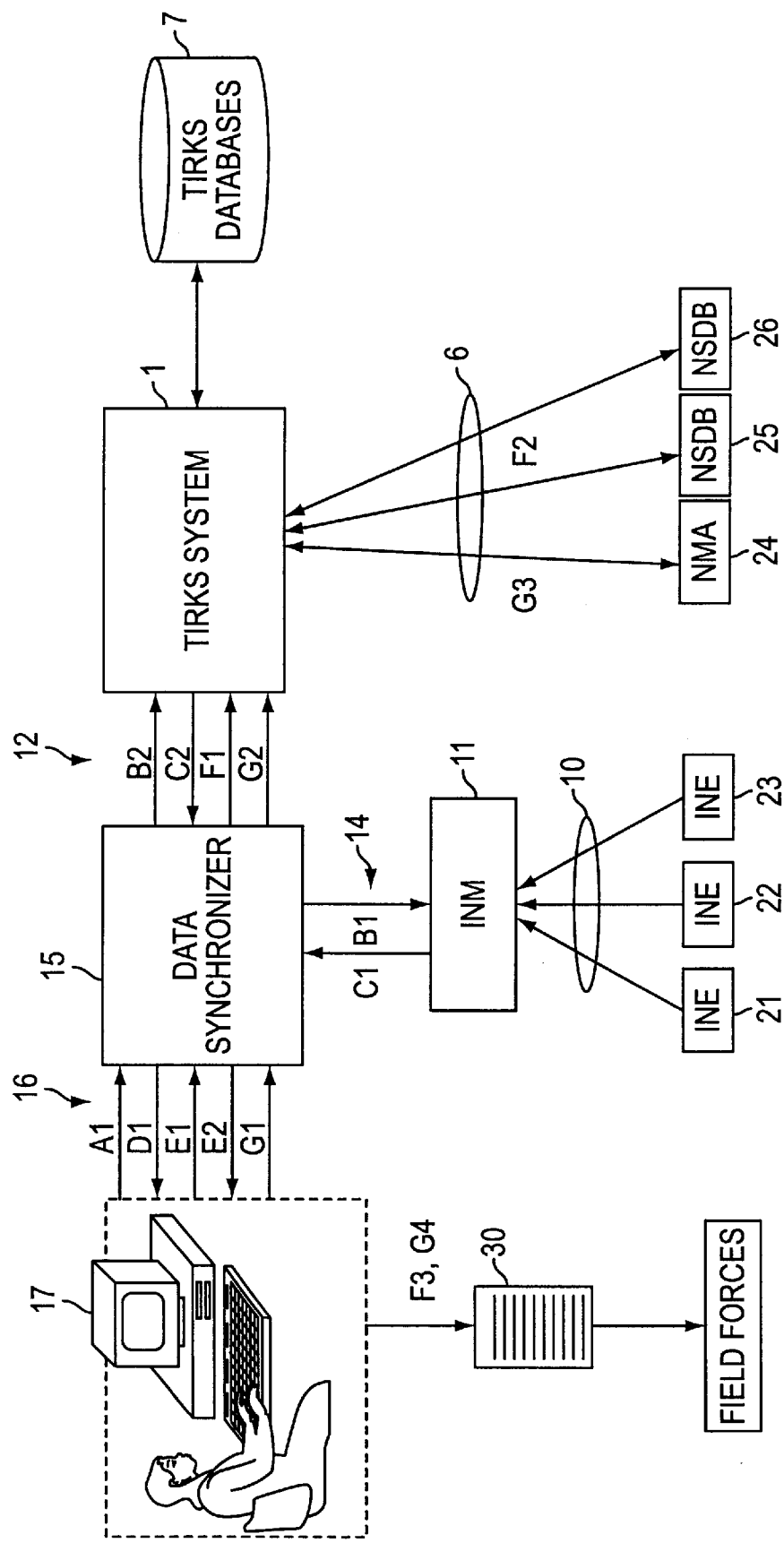
FIG. 3 illustrates the flow diagram of the method according to the invention.

The processing flows described below correspond with items marked by letters in FIG. 3, described next.

First, the user initiates an inventory verification and update run shown at A1 on interface 16, through terminal 17, specifying the HICAP circuits to be queried, whether it is to be an audit-only or auto-update run. In one embodiment, the user can specify the type of data to be returned (e.g. network element type, trail ID, slot ID, the ratio of carrier on a certain trail, etc.) and the format (e.g., the fields and size). Data synchronizer 15 determines the INM 11 and TIRKS 1 involved, shown by letters B1 on interface 14 and B2 on interface 12. Data synchronizer 15 also sends a request to each INM specifying the data to be returned.

In the next step, both INM 11 and TIRKS 1 return the requested data to data synchronizer 15, shown by C1 on interfaces 14 and C2 on interface 12.

Data synchronizer 15 converts and compares the INM-supplied data with the contents of TIRKS data and provides the results of the comparison to user on GUI 16, for display on terminal 17, shown at D1.

Based on criteria pre-specified and entered by the user, shown by E1 on interface 16, data synchronizer 15 determines for each data discrepancy whether it can automatically correct the TIRKS databases, or if human analysis and input is required. In general, data synchronizer 15 detects discrepancies, corrects them and provides new work order record details (WORD) documents, if the previous work order record details (WORD) documents are affected by the discrepancies.

For an audit-only run, data synchronizer 15 provides the user access to the output of the verification run along with associated correction recommendations, shown by E2 on interface 16. The user investigates the discrepancies and either mitigates the correction process shown at G1 on interface 16, G2 on interface 12, and G3 on interface 6, or elects to do nothing.

For each discrepancy that can be automatically corrected, the data synchronizer 15 triggers the process to correct impacted TIRKS databases 7, shown by F1 and F2, on interfaces 12, and respectively 6.

Furthermore, the WORD (work order record details) documents for all affected carriers and services are reissued, shown at F3 and G4. An audit trail is produced on request for all changes made.

The effectiveness of this feature is highly dependent on the completeness and accuracy of the data provided by the IMNS.

Figure 4:
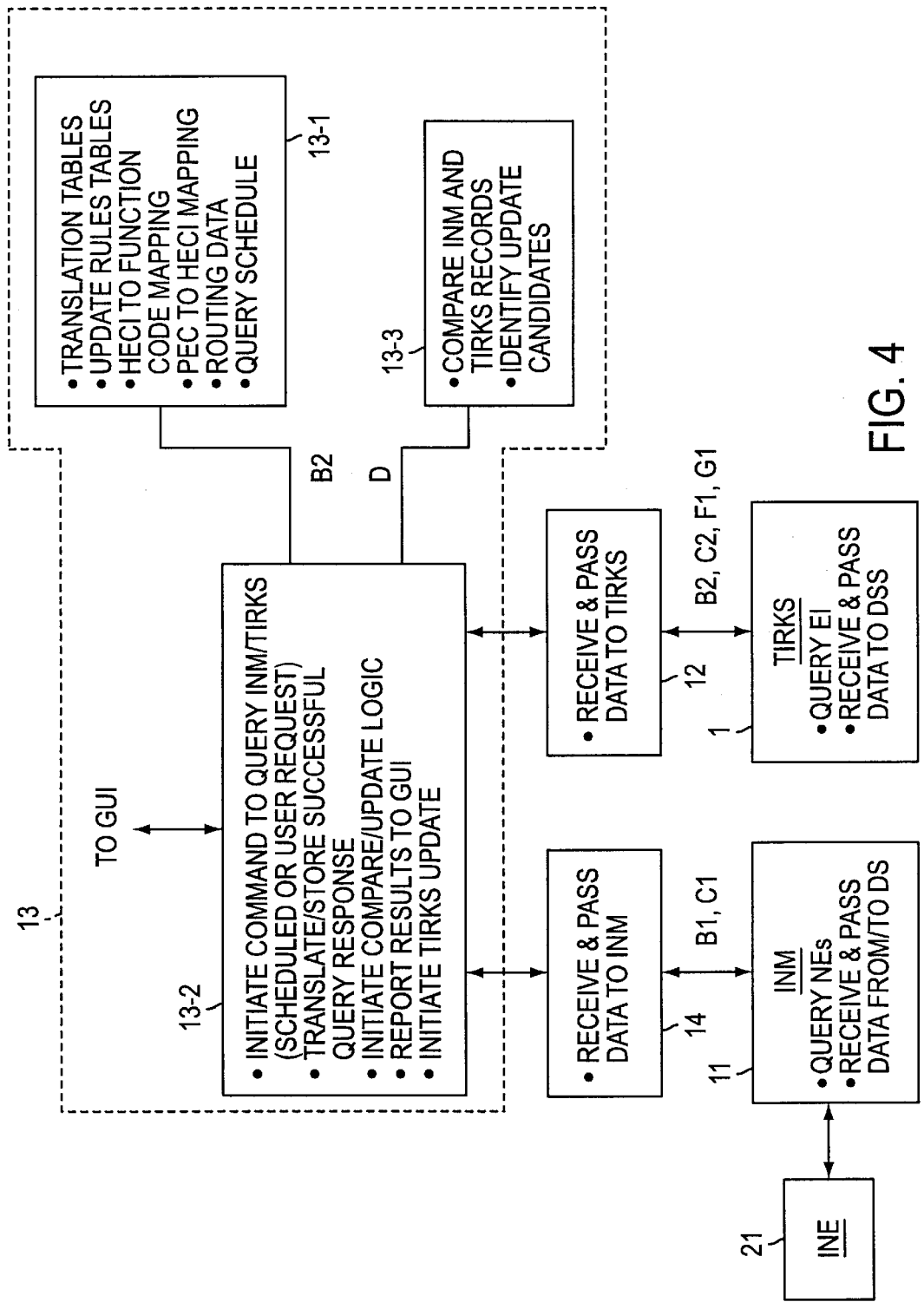
FIG. 4 shows data synchronizer functionality.

FIG. 4 shows data synchronizer functionality. As part of synchronizer logic 13, data module 13-1 stores the data manipulated by the synchronizer. The data typically comprises tables, such as translation tables (vendor and product specific) to map data (equipment type, slot identification, etc.) from INM 11 to data fields in TIRKS. Update rules tables are also maintained in module 13-1, along with human equipment catalogue item (HECI) for function code mapping, product equipment code (PEC) for HECI mapping, routing data and a query schedule. While data is typically stored in table form, other information storage formats may be used as well, without departing from the scope of the invention.

Module 13-2 is the configuration manager of the synchronizer logic 13. This module performs an initiate command, for initiating the query to INM 11 and TIRKS 1. This command may be scheduled, according to the query schedule in the data module 13-1, or could be initiated on request by user. The responses to the queries are translated in this module and stored in the appropriate format in the data module 13-1. A compare/update module 13-3 is initiated by the configuration manager module 13-2, and the results of the comparison received form it are reported to the GUI 16. Configuration manager module 13-2 is also responsible with initiating the automatic or user requested update of the TIRKS 1.

The compare/update logic module 13-3 performs various plug-in inventories. For example, it checks the existence of "equipment mounting" returned in query from TIRKS and INM. An exception is reported if the equipment mounting is not found in either database.

Compare/update logic module 13-3 determines the discrepancy type by comparing the data returned from TIRKS and the INM. This comparison is effected on a slot-by-slot basis, and data checks can be different for assignable versus common plugs. The data that are compared are, for example, plug-in existence or not, if HECI is the same or different, and whenever HECI is different, the function code mapping table is checked. Also, module 13-3 checks circuit ID existence in INM, and slot status (working or not working), Furthermore, compare/update logic module 13-3 determines an E1 record update processing required using the update rules table. The table allows the user to specify which discrepancy types are candidates for auto-updates, and determine whether a WORD should be sent using a user specific parameter. Compare/update logic module 13-3 also provides record information and discrepancy conditions.

Interface 14 operates to receive and pass data between synchronizer logic 13 and INM 11, while interface 12 receives and passes data between synchronizer logic 13 and TIRKS 1.

Figure 5:
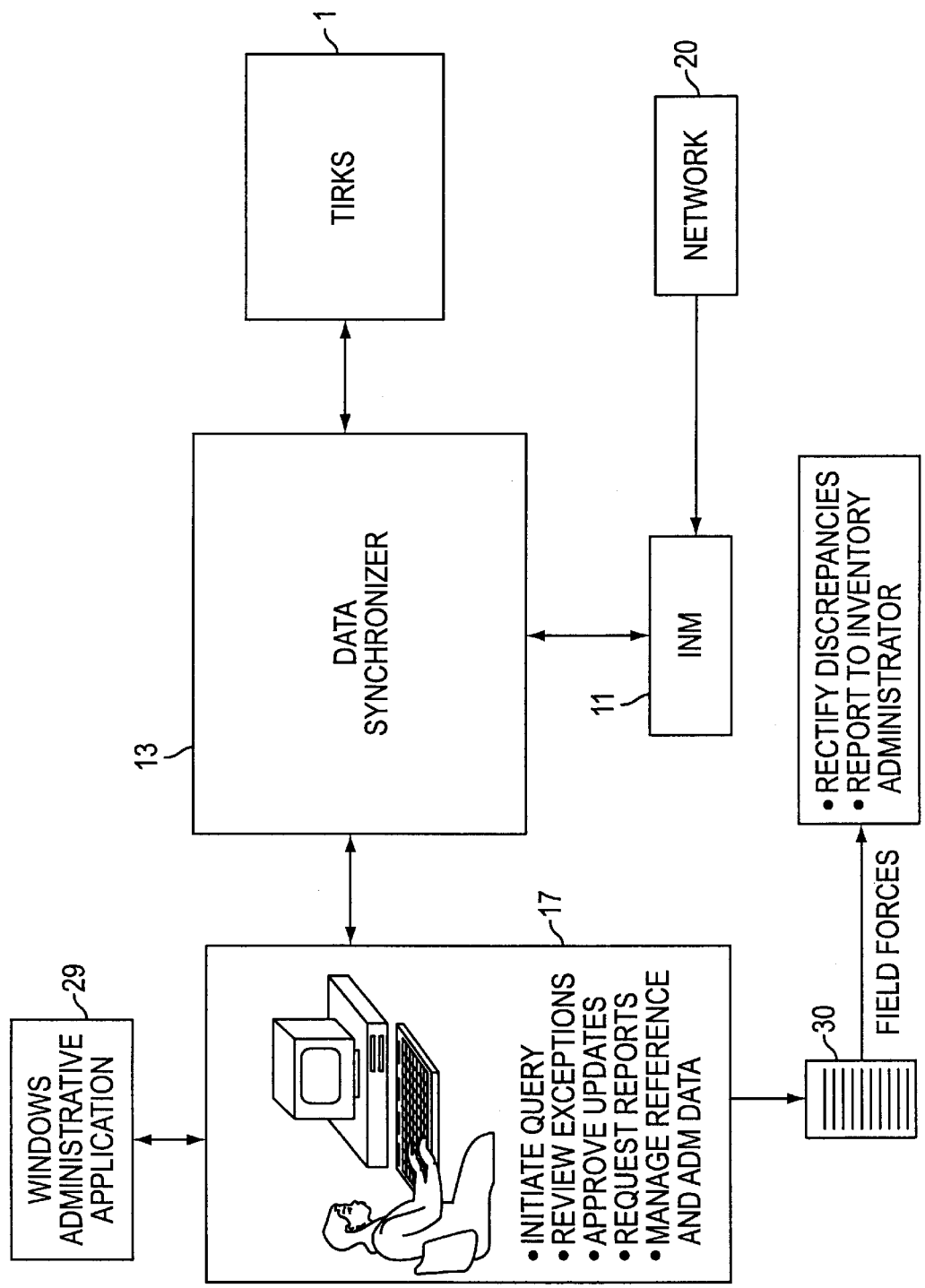
FIG. 5 illustrates GUI functionality.

FIG. 5 shows functionality of GUI 16. The main functions of the GUI are initiating a network element comparison query, saving a query for a later use, reviewing the output and providing network element comparison reports, administrative features and on-line help. An administrative application program, such as Windows Administration Application 29 can facilitate a user performing these functions through terminal 17.

In operation, a comparison query is initiated by a logical identifier (e.g. network code SCID), by a physical identifier (e.g. location/relay rack or HECI), by selecting one of the plug-in inventory or connection inventory, and setting the query options. Such options may be for the output mode: view only, view and update, show all records or show only discrepancies, automatic update of plug-in discrepancies using defined rules, and output directly to the printer and/or file.

Network element comparison reports can be performed after setting output filter options to show all records or discrepancies only, or to show discrepancies based on discrepancy type. The reports may also identify the discrepancies, display all data from INM 11 and TIRKS down to the slot level. In update mode, it can allow a plug-in update by discrepancy type or at the slot level. The report may be printed as a written report 30. Field forces can use this information to rectify discrepancies and report to the inventory administrator, as shown at 31 in FIG. 5.

Administrative features include security and logon procedures, providing default values and reference data at installation, scheduling the queries, ability to initiate a query to E1/catalog for HECI to function code mapping.

TIRKS 1 must be updated to accommodate the queries to the equipment inventory (E1), and also to receive and pass data from/to data synchronizer 15. The equipment inventory (E1), the E1 catalogue event driven interproduct interface system (EDIIS) and TIRKS communication modules of TIRKS 1 are also affected by provision of data synchronizer 15. Thus, a software program reads the E1 hierarchy in the data base to gather data to construct slot identifications for assignable entities associated with one or more plug-ins. An E1 national catalogue in the data base must be accessed to extract a subset of data to be used for human equipment catalogue inventory group (HECIG). Furthermore, an additional query is used to provide network connectivity data. This information is used as discussed herein by the data synchronizer and other system elements.

Those of ordinary skill will recognize that a method and system according to the invention can be implemented using a processor and memory or by other hard wired circuitry.

While a preferred embodiment has been described herein, those of ordinary skill will recognize that modifications or variations of the described embodiment may be made within the teachings of the invention, without departing from the scope of the invention set forth in the appended claims.

We claim:

1. In a communication network, a method for alignment of inventory data obtained with a trunk integrated record keeping system (TIRKS) using a network manager, the network manager controlling network elements, comprising the steps of:

requesting an inventory verification specifying a type of data to be returned;

initiating a command to separately query said network manager and said TIRKS regarding said type of data on said network;

receiving, in response to said command, current inventory data returned from said network manager and said inventory data returned by said TIRKS; and comparing said current inventory data with said inventory data to determine a data discrepancy.

2. A method as claimed in claim 1, further comprising:

providing specified criteria for treatment of said data discrepancy in said inventory data; and correcting said inventory data according to said current inventory data.

3. A method as claimed in claim 2, wherein said specified criteria for treatment of said data discrepancy comprises an indication to correct said inventory data in one of an automatic or a manual mode.

4. A method as claimed in claim 2, wherein said step of correcting said inventory data comprises triggering the update of a TIRKS database comprising said inventory data whenever said discrepancy is detected.

5. A method as claimed in claim 4, further comprising producing an audit trail for a correction effected on said inventory data according to said current inventory data.

6. A method as claimed in claim 1, wherein said type of data to be returned includes inventory data on all network elements of said communication network.

7. A method as claimed in claim 1, wherein said type of data to be returned includes connectivity data on trails between specified network elements of said communication network.

8. A method as claimed in claim 1, wherein said command includes information on the format of said inventory data.

9. A method as claimed in claim 1, wherein said command includes information on the type of said inventory data.

10. A method as claimed in claim 1, wherein said inventory verification is initiated automatically at pre-set intervals.

11. In a communication network, a data synchronizer for alignment of inventory data obtained with a TIRKS and a network manager, the network manager controlling network elements, comprising:

a synchronizer logic for receiving an inventory verification request regarding a type of data on said network and providing a discrepancy data whenever a current inventory data returned by said network manager differs from the inventory data returned by said TIRKS;

an interface for transmitting said inventory verification request from a user and for providing said data discrepancy to the user;

a first interface between said network manager and said data synchronizer for producing said current inventory data in response to said inventory verification request; and a second interface between said TIRKS and said data synchronizer for producing said inventory data in response to said inventory verification request.

12. A data synchronizer as claimed in claim 11, wherein said synchronizer logic comprises:

a memory for storing an inventory table of a selected structure;

a configuration manager for receiving, in response to said command, current inventory data from said network manager and said inventory data from said TIRKS and for mapping said current inventory data and said inventory data into said inventory table;

a compare/update logic unit for comparing said current inventory data with said inventory data to determine said data discrepancy.

* * * * *